3,649,461
PAPER STRIP TEST FOR CITRATE UTILIZATION
George L. Evans, Hopatcong, Donald P. Kronish, Rockaway, Metka Prevorsek, Morristown, Benjamin S. Schwartz, Livingston, and Lee S. Zuriff, Parsippany, N.J., assignors to Warner-Lambert Company, Morris Plains, N.J.
No Drawing. Continuation-in-part of application Ser. No. 632,894, Apr. 24, 1967. This application Aug. 9, 1968, Ser. No. 751,342
Int. Cl. C12k 1/00
U.S. Cl. 195—103.5                                    6 Claims

ABSTRACT OF THE DISCLOSURE

A paper strip material is impregnated in consecutive zones with (1) a reagent medium consisting of a citrate source such as citric acid or a citrate salt, and a buffer system which maintains the pH of this reagent medium at about 6.4; (2) a microbiologically inert hydrophobic barrier; (3) a pH indicator or a combination of indicators which changes color between a pH of 6 and a pH of 8. Suitable buffers include a phosphate buffer prepared from monobasic potassium phosphate and dibasic potassium phosphate; a Gomori tris-maleate buffer, formed from tris-(hydroxy methyl)aminomethane and maleic acid; and a Kolthoff borax-phosphate buffer which is a combination of sodium borate and monobasic potassium phosphate. Suitable indicators include: a combination of Brom Thymol Blue and a water soluble grade of Phenol Red; Neutral Red; Phenol Red; Rosolic Acid; m-Dinitrobenzoylene Urea; Brilliant Yellow; and Quinoline Blue. The reagent medium and the indicator system are adjusted to a pH of 6.4 before application to the paper strip. Cultures grown on a non-citrate containing medium can be tested for citrate utilization by incubation in contact with the reagent zone of the paper strip for approximately 4 hours, and then contacting the culture with the indicator zone of the paper strip and observing the color change approximately one-half hour later.

CROSS REFERENCE TO RELATED APPLICATION

This application is a continuation-in-part of our copending application, U.S. Ser. No. 632,894, filed Apr. 24, 1967, now abandoned.

BACKGROUND OF THE INVENTION

The citrate utilization test is based on the fact that certain micro-organisms are capable of utilizing sodium citrate as their sole source of carbon. They will grow in a chemically defined medium in which sodium citrate is the only carbon compound present. Certain unknown alkaline metabolites are produced during growth and a measurable pH change in the culture medium results. Other micro-organisms do not utilize citrate in this manner and no pH change occurs.

The citrate utilization test is well known in the field of microbiological testing. It is one of a series of tests known collectively as IMViC reactions (I=indol, M=methyl red, V=Voges-Proskauer reaction and C=citrate). These tests are used, for the most part, to differentiate the various organisms in the family Enterobacteriaceae. The differentiation of Salmonella from Shigella is particularly important in diagnostic bacteriology; and the differentiation of Aerobacter-Klebsiella from *Escherichia coli* is of significance in testing water for potability and in diagnostic bacteriology. The presence of *E. coli* in water indicates fecal contamination. In the conventional Simmons' citrate test, one indicator is used which changes color with pH change as a positive reaction to citrate utilization (J. Infectious Diseases 39: 209–214, 1926). With the Simmons' test, the incubation time may have to be extended for four days to insure detection of delayed positive reactions. This is obviously highly undesirable in a clinical laboratory.

Hargove and Weaver modified the Simmons' test, varying the composition of the growth medium for the development of a rapid microtechnic (Am. J. Clin. Path. 21: 286–289, 1951). Hargrove and Weaver suggest that cultures for inoculation should be grown on a culture medium containing citrate as one of the sources of carbon, to limit the incubation time required to 10 to 12 hours. However, growing cultures on a citrate containing medium prior to incubation for the citrate test can require as much as forty-eight hours, hence, actual time save is negligible. Tests made with cultures grown on a non-citrate containing medium require an incubation time of 20 to 48 hours. The indicator Brom Thymol Blue, used in the above Hargrove and Weaver modification, is not incorporated in the culture medium but added after incubation, since it tends to be reduced by bacterial action.

After the addition of Brom Thymol Blue a reaction period of 90 minutes is adequate for a positive result, indicated by a deep blue coloration. A definite green color is considered a negative reaction. At times, an indeterminate bluish-green color develops. For some positive cultures, an additional reaction time of two hours will resolve the problem, since some organisms utilize the citrate in this reaction at a slower rate. However, the detection of certain species remains difficult.

It is obvious that there are many disadvantages connected with the Hargrove-Weaver modification of the citrate test. Lengthy test procedures involving storage and repeated handling of test samples tend to minimize the effectiveness of any bacteriological laboratory testing. For instance, when the community water supply is under study, considerable illness may result due to lengthy test procedures. Any delay in determination of the identity of micro-organisms can be a health hazard, since it may be some time before corrective measures, if necessary, are initiated.

In an attempt to develop a rapid paper strip test for citrate utilization, known citrate test systems were investigated by application to bibulous materials. None of these products were found to be a significant improvement over prior methods.

SUMMARY OF THE INVENTION

This invention relates to an impregnated paper strip for the rapid and positive indentification of citrate utilization by micro-organisms. Consecutive zones in the paper strip are impregnated with: (1) a reagent medium consisting of a citrate source such as citric acid or a citrate salt, and a buffer system, which maintains the pH of this reagent medium at about 6.4, selected from the group: a phosphate buffer prepared from monobasic potassium phosphate and dibasic potassium phosphate; a Gomori tris-maleate buffer, formed from tris-(hydroxy methyl)aminomethane and maleic acid; and a Kolthoff borax-phosphate buffer which is a combination of sodium borate and monobasic potassium phosphate; (2) a microbiologically inert hydrophobic barrier; and (3) a pH indicator or a combination of indicators which changes color between a pH of about 6 and a pH of about 8, selected from the group: Brom Thymol Blue and a water soluble grade of Phenol Red; Neutral Red; Phenol Red; Rosolic Acid; m-Dinitrobenzoylene Urea; Brilliant Yellow; and Quinoline Blue.

The reagent medium and the indicator system are adjusted to a pH of about 6.4 before application to the paper strip by the addition of an acid or base which does not interfere with the microbiological reaction.

DESCRIPTION OF THE INVENTION

It is the primary object of this invention to provide a diagnostic preparation which permits the rapid and positive identification of micro-organisms utilizing citrate in culture media.

It is another object of this invention to provide an improved citrate utilization test wherein results are obtained in approximately 4.5 hours, in spite of the fact that the cultures for inoculation are not grown in a citrate-containing culture medium.

It is yet another object of this invention to provide a more definite color response to indicate positive and negative reactions to citrate utilization.

Other objects and advantages of this invention will become apparent from the following detailed description.

We have now found that cultures grown on a non-citrate containing medium can be tested for utilization of citrate by incubating a large inoculum of the micro-organisms at a temperature ranging from about 34° to 37° C. for a period of time of from about three to six hours in the presence of the citrate containing reagent zone of the diagnostic test strip of this invention. Actually the incubation time and temperature can be varied widely to achieve growth of organisms and subsequent production of citrate. However, incubating for more than six hours, which would be required for temperatures lower than 34° C., reduces the time advantage over the standard test procedures obtained by incubating at higher temperatures. Further, while incubating at temperatures above 37° C. is possible with some organisms, this in undesirable, since one is identifying unknown organisms some of which cannot live at higher than 39° C. Fluctuations in typical incubation baths are usually ±2° C., so for reliable results, about 37° C. has been selected as the safest high temperature.

For the preferred embodiment of our invention, a large inoculum of the unknown microorganisms is incubated at about 37° C. for at least four hours in the presence of the citrate-containing reagent and then brought into contact with the indicator or combination of indicators for at least thirty minutes.

We have also found that an advantageous carrier for both the reagent medium and the indicator system is a strip of bibulous material impregnated over a portion of its area with the reagent medium and over another portion of its area with the indicator combination system. These impregnated zones are separated by a hydrophobic barrier zone.

While any suitable source of citrate which can be utilized by the microbiological organisms is applicable in this invention, we have found that citric acid, sodium citrate and potassium citrate are preferred for the reagent medium. Actually, the use of citric acid requires the subsequent addition of an alkaline material which is microbiologically inert in order to bring the pH of the reaction medium to about 6.4 for optimum utilization of the citrate by the micro-organisms under study. Suitable microbiologically inert, alkaline materials include sodium, potassium, and ammonium hydroxide. These bases, when added to a citric acid solution, form the citrate salt. Therefore, the initial use of a citrate salt such as sodium or potassium citrate is the preferred source of citrate for the reagent medium. Approximately 8 to 12 grams of citrate dissolved in distilled water to yield about 100 milliliters of solution has been found to provide sufficient citrate when applied to a strip of bibulous material for utilization by micro-organisms under study.

A buffer is included in the reagent medium to maintain the optimum pH of about 6.4. The production of alkaline metabolites by micro-organisms utilizing the citrate will, of course, raise the pH of the system. This is the measurable change which indicates a positive reaction to the test. The presence of the buffer, however, prevents identification of false positives which can result from such factors as cell lysis. Buffers which do not adversely affect the growth of the micro-organisms under study and which give a pH of about 6.4 are required. The following are suitable: a phosphate buffer prepared from mono-basic potassium phosphate and dibasic potassium phosphate; a Gomori tri-maleate buffer, formed from tris-(hydroxy methyl)aminomethane and maleic acid; and a Kolthoff borax-phosphate buffer which is a combination of sodium borate and monobasic potassium phosphate. The make-up of the buffer must be such that the system to which it is added resists alteration of a pH of about 6.4. The following buffer ingredients, when added to from about 8 to about 12 grams of the citrate source in a distilled water solution of about 100 milliliters, have been found to give an effective reagent medium which can be applied successfully to our bibulous test strips:

(a) phosphate buffer: about 2.5 grams monobasic potassium phosphate and about 0.5 gram dibasic potassium phosphate;
(b) Gomori tris-maleate buffer: about 4.23 grams of tris-(hydroxy methyl)aminomethane and about 4.16 grams maleic acid; and
(c) Kolthoff borax-phosphate buffer: about 1.1 grams sodium borate and about 2.6 grams monobasic potassium phosphate.

Each system is, of course, adjusted to a pH of about 6.4 by the addition of a sufficient amount of an acid or base which does not interfere with the microbiological reaction, e.g., hydrochloric, nitric, or phosphoric acid and sodium, potassium, or ammonium hydroxide, respectively.

The preferred reagent medium for application to our bibulous test strip contains, in each distilled water solution of about 100 milliliters, the following ingredients:

(a) from about 8 to 12 grams sodium citrate,
(b) about 2.5 grams monobasic potassium phosphate, and
(c) about 0.5 gram dibasic potassium phosphate.

The pH of the above reagent medium is adjusted to about 6.4 by the addition of a sufficient amount of one of the above mentioned acids or bases which does not interfere with the microbiological reaction.

The most preferred reagent medium contains in each distilled water solution of about 100 milliliters:

(a) about 10 grams sodium citrate,
(b) about 2.5 grams monobasic potassium phosphate,
(c) about 0.5 gram dibasic potassium phosphate, and
(d) sufficient 1 N hydrochloric acid, or 1 N sodium hydroxide to adjust the pH to about 6.4.

A pH indicator or combination of pH indicators which provides a reliable and distinct color change between a pH of about 6 to about 8, in the presence of the growing microorganisms, is applied to our diagnostic test strip to indicate positive or negative citrate utilization. The following pH indicators perform this function and provide a stable test product when applied to our bibulous test strip. Stability is sufficient to allow marketability and insure reliability of the marketed product.

(1) Brom Tymol Blue and Phenol Red, water soluble
    changes from brown to purple between a pH of about 6.4 to 7.5
(2) Neutral Red
    changes from red to yellow between a pH of about 6.8 to 8.0
(3) Phenol Red
    changes from yellow to red between a pH of about 6.8 to 8.4
(4) Rosolic acid
    changes from brown to red between a pH of about 6.8 to 8.0
(5) m-Dinitrobenzoylene Urea
    changes from colorless to yellow between a pH of about 6.4 to 8.0
(6) Brilliant Yellow
    changes from yellow to orange between a pH of about 6.6 to 7.8
(7) Quinoline Blue
    changes from colorless to blue between a pH of about 6.6 to 8.6

Solutions of the indicators are made up for application to the bibulous material. Distilled water is the usual solvent, but for certain indicators, an additional solvent, such as methyl, ethyl, propyl or butyl alcohol may be needed to aid in obtaining a solution. The compositions of indicator solutions are listed in the two tables below:

Of the above, the most preferred indicator solution is Number 1, the Brom Thymol Blue and Phenol Red combination.

In the preferred embodiment of our invention, using the Brom Thymol Blue/Phenol Red combination, an interim pH adjustment is made during the preparation of the indicator system. A solution of the Brom Thymol Blue in the ethyl alcohol, to which about 25 ml. of the distilled water has been added, is brought to a measured pH of about 6.4 (as determined on a Beckman pH meter) by the addition of 0.1 N sodium hydroxide. After adding the Phenol Red and sufficient distilled water to bring the volume to about 100 ml., it is necessary to adjust the pH once again to about 6.4 by the addition of 0.1 N hydrochloric acid. It has been found that this step-by-step procedure materially improves the workability of the product.

The hydrophobic barrier composition must prevent the leaching of the culture medium or reagent across the bibulous material into the indicator zone during incubation. It should also be microbiologically inert in this system. Any substance which will form a water-proof barrier of this type may be used. Suitable materials include waxes, lacquers, and plastics, particularly a colorless polymerized methyl methacrylate coating composition sold under the trade name Krylon 150 Crystal Clear by Krylon, Inc., Norristown, Pa. The Krylon material is particularly preferred. It is supplied in a toluene vehicle and may be diluted for ease of application with additional toluene or other hydro-carbon thinners, such as ethyl, methyl, or propyl alcohol U.S.P.

It has been found that about 100 ml. of barrier solution made from 75 to 100 ml. Krylon and 0 to 25 ml. diluent is suitable. A particularly preferred combination is pre-

TABLE 1

| | Indicator composition | Broad range (grams) | Solvent |
|---|---|---|---|
| 1 | {Brom Thymol Blue | About 0.18–0.22 | }22.5 to 27.5 ml. of 1–4C alcohol, q.s. to about 100 ml. with distilled water. |
| | {Phenol Red, water-soluble | About 0.18–0.22 | |
| 2 | Neutral Red | About 0.2–0.7 | 5–60 ml. of 1–4C alcohol, q.s. to about 100 ml. with distilled water. |
| 3 | Phenol Red | About 0.025–0.075 | 30–90 ml. of 1–4C alcohol, q.s. to about 100 ml. with distilled water. |
| 4 | Rosolic acid | About 0.2–0.6 | 90–100 ml. of 1–4C alcohol, q.s. to about 100 ml. with distilled water. |
| 5 | m-Dinitrobenzoylene urea | About 0.3–0.7 | Q.s. to about 100 ml. with distilled water. |
| 6 | Brilliant Yellow | About 0.75–1.5 | Do. |
| 7 | Quinoline Blue | About 0.2–1.2 | Q.s. to about 100 ml. with 50–100% ethanol. |

The indicator solution is adjusted to a measured pH of about 6.4, by the addition of a sufficient amount of the previously mentioned acids or bases and applied to the indicator zone of our test strip. When brought into contact with the microbiological culture under study, a distinct color can be observed for a positive reaction as the culture medium reaches an alkaline pH between about pH 7.4 to about 7.6 due to the production of alkaline metabolites as the citrate is utilized by the growing microorganism. If the citrate is not utilized, an acid color of the indicator is maintained to indicate a negative reaction. The preferred range for the ingredients of the indicator solutions of this invention are:

pared from about 85 ml. Krylon with about 15 ml. ethyl alcohol U.S.P.

The bibulous materials suitable for the practice of this invention are those materials, which, by means of capillary action, are able to hold liquid. Such materials include filter paper, felt, porous ceramic strips, woven or matted glass fiber and the like. A particularly preferred paper is Eaton-Dikeman No. 623 filter paper (70 pounds).

It is possible to prepare a diagnostic product from a bibulous material having only three zones: a reagent zone, a barrier zone and an indicator zone, wherein the third zone containing the indicator is at the end of the test strip. Handling of such a three-zone test strip is awkward since there is some danger of alteration of the pH of the

TABLE 2

| | Indicator | Preferred range (grams) | Solvent |
|---|---|---|---|
| 1 | {Brom Thymol Blue | About 0.2 | }About 25 ml. ethyl alcohol, q.s. to about 100 ml. with distilled water. |
| | {Phenol Red, water-soluble | About 0.2 | |
| 2 | Neutral Red | About 0.45 | About 32.5 ml. ethanol, q.s. to about 100 ml. with distilled watre. |
| 3 | Phenol Red, water-soluble | About 0.055 | About 60 ml. ethanol, q.s. to about 100 ml. with distilled water. |
| 4 | Rosolic acid | About 0.4 | About 95 ml. ethanol, q.s. to about 100 ml. with distilled water. |
| 5 | m-Dinitrobenzoylene urea | About 0.5 | Q.s. to about 100 ml. with distilled water. |
| 6 | Brilliant Yellow | About 1.25 | Do. |
| 7 | Quinoline Blue | About 0.7 | About 75 ml. ethanol, q.s. to about 100 ml. with distilled water. | indicator or reagent zone by contact with fingers. If forceps are used or if only the barrier zone is handled, the three-zone variation of the product can be used.

For ease of operation, the preferred diagnostic product is prepared from a bibulous material which is divided into at least four zones. Zones 2 and 4 are impregnated with the hydrophobic barrier composition and allowed to dry. The reagent medium is applied to zone 1 and the indicator system is applied to zone 3. Both are allowed to dry. Care must be taken to see that the various zones do not overlap.

To facilitate packaging, the impregnated bibulous material is normally cut into narrow strips suitable for insertion into a test tube, each strip containing all the impregnated zones.

The test is performed by suspending a heavy loopful of organisms (3.0 mm. loop) from an agar media such as a Triple Sugar Iron Agar, Tryptic Soy Agar, or Nutrient Agar Slant in 0.3 ml. saline in a Kahn tube. The strip of bibulous material is inserted into the suspension of organisms in such a manner that zone 1, impregnated with the reagent medium, is in contact with the suspension of organisms, while zone 3, impregnated with the indicator zone, is not. The test tube containing the strip is incubated at 37° C. for four hours. The tube is then tilted to wet zone 3 of the strip with the suspension of organisms and bring the test system into contact with the indicator. The test tube is returned to normal position and held at room temperature for about 30 minutes.

When the diagnostic product contains the most preferred indicator combination (Brom Thymol Blue and Phenol Red), utilization of citrate or a "positive reaction" is indicated by a purple coloration of a shade corresponding to the Lewis Roberts Matchmaker Color Chart numbers MM272 (strong), MM294, MM314, and MM315 (weak). A negative reaction is indicated by a brown color of a shade corresponding to the Lewis Roberts Matchmaker Color Chart numbers MM374 and MM353. (Lewis Roberts, Inc., 72 Union St., Newark, N.J.) Thus, a definite color change is obtained and the ambiguous blue-green color which sometimes occurred when the previously used Hargrove-Weaver modification was applied to a paper strip is avoided. Moreover, the combined indicator solution gives a positive reaction at a lower pH (7.5) than the positive reaction (pH 7.6) of the Hargrove-Weaver test. This difference of 0.1 in pH is significant in this test since the alkaline metabolites produced by organisms utilizing citrate cause relatively small changes in pH. As a result, organisms which utilize citrate slowly show a more strongly positive reaction.

While the diagnostic test of the instant invention may be used to distinguish any organisms which typically utilize citrate from those which typically do not utilize citrate, it is particularly effective with certain genera and species in the Enterobacteriaceae.

In a clinical microbiology laboratory, the principal use for the citrate utilization test is in the differentiation of *E. coli* from Aerobacter-Klebsiella, and in the differentiation of Salmonella from Shigella.

The following examples are included in order to further illustrate this invention.

EXAMPLE 1

(A) Preparation of reagent medium

Dissolve 10 grams of sodium citrate (granules), 2.5 grams of monobasic potassium phosphate, and 0.5 gram of dibasic potassium phosphate in distilled water to a volume of 100 ml. The pH is 6.1, and it is adjusted to pH 6.4 by adding 1 N sodium hydroxide.

(B) Preparation of indicator system

Dissolve 0.2 gram of Brom Thymol Blue in 25 milliliters of U.S.P. ethyl alcohol, 95%, and add 25 milliliters of distilled water. The measured pH is 3.0 (Beckman pH meter). Adjust to a measured pH of 6.4 by adding 0.1 N sodium hydroxide. Dissolve 0.2 gram Phenol Red, water soluble) Matheson Coleman and Bell) in 50 milliliters of distilled water and mix with the previously prepared solution of Brom Thymol Blue. The pH of the mixture is 7.7. Adjust to a pH of 6.4 with 0.1 N hydrochloric acid.

(C) Preparation of the barrier composition 85.0 milliliters Krylon 150 Crystal Clear is diluted with 15.0 ml. of ethyl alcohol U.S.P. and mixed thoroughly.

(D) Application to bibulous material

A sheet of Eaton-Dikeman filter paper, 623–70 pounds, 82.4 mm. by 157.5 mm., is used as the stock for making 25 diagnostic paper strips for testing citrate utilization by micro-organisms.

One of the 157.5 mm. sides of the sheet is designated as the reference edge. Five bands are marked out directly below and parallel to this reference edge, having the dimensions listed below, measured from one reference edge contiguously from one band to the other:

Band 1—14 mm. (reagent zone)
Band 2—12.7 mm. (barrier zone)
Band 3—14 mm. (indicator zone)
Band 4—12.7 mm. (barrier zone)
Band 5—29 mm. (blank zone)

The Krylon barrier composition of Part C in Example 1 above is applied to Band 2 and to Band 4 in an amount sufficient to saturate the paper in each band. The sheet is allowed to dry in air to remove the solvent from the impregnated barrier bands.

The sheet is marked off in 6.3 mm. sections perpendicular to the reference edge. Twenty-five sections (to be cut into the diagnostic test strips after impregnations are completed) are obtained, each containing all five bands.

The reagent medium from Part A in Example 1 above is placed in a Syringe Microbiuret No. S1/4 LT, calibrated to 0.200 microliter per division (Model No. SB2, Micro-Meter Instrument Company, Cleveland, Ohio). The dial is set to 45, which will emit 9.00 microliters. This amount is applied to each of the 25 sections previously marked off in Band 1 perpendicularly to the reference edge. .225 ml. is required. The sheet is allowed to dry in air.

The indicator medium from Part B in Example 1 above is placed in the above described microbiuret, set at 45, to give 9.00 microliters. This amount is applied to each of the 25 sections previously marked off in Band 3 perpendicularly to the reference edge. .225 ml. is required. The sheet is allowed to dry in air.

The sheet is then cut into the 6.3 mm. strips previously marked off, perpendicular to the reference edge.

The diagnostic test strips are packed in test tubes containing a desiccant.

EXAMPLE 2

Use of the diagnostic paper strips

Cultures of *Escherichia coli*, Aerobacter-Klebsiella, Citrobacter, Serratia, Salmonella, Shigella, *Proteus vulgaris*, *Proteus mirabillis*, *Proteus morganii*, and *Proteus rettegri* are grown on suitable agar media. A heavy loopful (using a 3 mm. loop) of each culture is suspended in 0.3 ml. of saline in Kahn tubes and the two-zone diagnostic test strip of this invention, prepared as in Example 1 above, is inserted in each suspension in such a manner that the end of the strip containing the reagent medium zone is in contact with the culture. The tubes are incubated at 37° C. for 4 hours after which the tube is tilted to wet the indicator zone. The tube is kept at room temperature for 30 minutes and then read. A positive reaction is indicated by dark to deep purple color, Lewis Roberts Matchmaker Color Chart number MM272, MM294, MM314, and MM315. A negative reaction is indicated by moderate to strong brown (Lewis Robert Matchmaker Color Chart number MM374 and MM353).

Results are listed below, along with reactions to the Simmons' Citrate Test:

| Organism | Total number tested | Citrate strip Number positive | Citrate strip Number negative | Simmons' citrate test Number positive | Simmons' citrate test Number delayed | Simmons' citrate test Number negative |
|---|---|---|---|---|---|---|
| E. coli | 10 | 0 | 10 | 0 | 0 | 10 |
| Klebsiella-aerobacter | 14 | ¹13 | ²1 | 13 | 0 | 1 |
| Citrobacter | 3 | ³3 | 0 | 2 | 1 | 0 |
| Serratia | 1 | 1 | 0 | 1 | 0 | 0 |
| Salmonella | 3 | 3 | 0 | 3 | 0 | 0 |
| Shigella | 17 | 0 | 17 | 0 | 0 | 17 |
| Proteus vulgaris | 11 | 6 | ²5 | 2 | 4 | 5 |
| Proteus mirabillis | 55 | 55 | 0 | 44 | 11 | 0 |
| Proteus morganii | 11 | 10 | 1 | 0 | 0 | 11 |
| Proteus rettgeri | 8 | 8 | 0 | 8 | 0 | 0 |

¹ Two of these cultures gave weakly positive reactions.
² The same strain or strains was negative by both conventional and strip test.
³ One of these cultures gave a weakly positive reaction and gave a delayed positive reaction in the Simmons' test.

The data obtained from the diagnostic strip test of this investigation is confirmed by the Simmons' Citrate test for all organisms, except *P. morganii*, where the reactions of 11 species were atypical. There is no apparent explanation for this deviation, but the results do not significantly affect the utility of the diagnostic strip test, inasmuch as *P. morganii* would be shown as atypical.

It is understood that the foregoing detailed description is given merely by way of illustration and that many variations may be made therein without departing from the spirit of our invention.

Having described our invention, what we desire to secure by Letters Patent is:

1. A diagnostic preparation for the rapid and positive detection of citrate utilization by microorganisms which comprises a bibulous material having at least three zones, wherein there has been impregnated:
   (A) In zone 1, 9 microliters of a reagent consisting essentially of:
      (1) from about 8 to 12 grams of a source of citrate selected from the group consisting of citric acid, sodium citrate, and potassium citrate;
      (2) a microbiologically inert buffer selected from the group consisting of:
         (a) about 2.5 grams of monobasic potassium phosphate and about 0.5 gram of dibasic potassium phosphate,
         (b) about 4.23 grams of tris-(hydroxy methyl)aminomethane and about 4.16 grams of maleic acid, and
         (c) about 1.1 grams of sodium borate and about 2.6 grams of monobasic potassium phosphate; and
      (3) a sufficient amount of distilled water to bring the volume of the solution to abut 100 ml.; said reagent system having a pH of about 6.4;
   (B) In zone 2, a sufficient amount of a micro-biologically inert hydrophobic barrier composition to saturate the bibulous material; and
   (C) In zone 3, 9 microliters of at least one indicator system selected from the group consisting of:
      (1) from about 0.18 to about 0.22 gram of Brom Thymol Blue, from about 0.18 to about 0.22 gram of Phenol Red (water soluble), from about 22.5 to about 27.5 ml. of a 1 to 4 carbon alcohol, and a sufficient amount of distilled water to bring the volume of the solution to about 100 ml;
      (2) from about 0.2 to about 0.7 gram of Neutral Red, from about 5 to about 60 ml. of a 1 to 4 carbon alcohol, and a sufficient amount of distilled water to bring the volume of the solution to about 100 ml.;
      (3) from about 0.025 to abot 0.075 gram of Phenol Red (water soluble), from about 30 to 90 ml. of a 1 to 4 carbon alcohol, and a sufficient amount of distilled water to bring the volume of the solution to about 100 ml.;
      (4) from about 0.2 to about 0.6 gram of rosolic acid, from about 90 to about 100 ml. of a 1 to 4 carbon alcohol and a sufficient amount of distilled water to bring the volume of the solution to about 100 ml.;
      (5) from about 0.3 to about 0.7 gram of m-dinitrobenzoylene urea, and a sufficient amount of distilled water to bring the volume of the solution to about 100 ml.;
      (6) from about 0.75 to about 1.5 grams of Brilliant Yellow, and a sufficient amount of distilled water to bring the volume of the solution to about 100 ml.; and
      (7) from about 0.2 to about 1.2 grams of Quinoline Blue, and a sufficient amount of 50 to 100% ethyl alcohol to bring the volume of the solution to about 100 ml.;
   said indicator system having a measured pH of about 6.4;
and wherein reagent system zone 1 is separated from indicator system zone 3 hydrophobic barrier zone 2.

2. A diagnostic preparation according to claim 1 having an additional barrier zone 4, contiguous only to indicator system zone 3, wherein there has been impregnated a sufficient amount of a microbiologically inert hydrophobic barrier composition to saturate the bibulous material.

3. A diagnostic preparation according to claim 1 wherein said reagent system consists essentially of:
   (1) from about 8 to about 12 grams of sodium citrate,
   (2) about 2.5 grams of monobasic potassium phosphate,
   (3) about 0.5 grams of dibasic potassium phosphate, and
   (4) a sufficient amount of distilled water to bring the volume of the solution to about 100 ml.;
and said indicator system consists essentially of:
   (1) from about 0.18 to about 0.22 gram of Brom Thymol Blue,
   (2) from about 0.18 to about 0.22 gram of Phenol Red water soluble,
   (3) from about 22.5 to about 27.5 ml. of an alcohol solvent selected from methyl, ethyl, propyl and butyl alcohol, and
   (4) a sufficient amount of distilled water to bring the volume of the solution to about 100 ml.

4. A diagnostic preparation according to claim 3 wherein said reagent system consists essentially of:
   (1) about 10 grams of sodium citrate,
   (2) about 2.5 grams of monobasic potassium phosphate,
   (3) about 0.5 gram of dibasic potassium phosphate and (4) a sufficient amount of distilled water to bring the volume of the solution to about 100 ml.;

said hydrophobic barrier composition comprises:
(1) from about 75 ml. to about 100 ml. of an acrylic resin coating composition, and
(2) from about 0 to about 25 ml. of a lower alcohol diluent for said acrylic resin coating composition; and said indicator system consists essentially of:
(1) about 0.2 gram of Brom Thymol Blue,
(2) about 0.2 gram of Phenol Red water soluble,
(3) about 25 ml. of ethyl alcohol, and
(4) a sufficient amount of distilled water to bring the volume of the solution to about 100 ml.

5. A process for the detection of citrate utilization by microorganisms comprising:
(A) allowing zone 1 of the diagnostic preparation of claim 1 to come into contact with a saline suspension of an unknown culture for from about 3 hours to about 6 hours, at a temperature ranging from about 34° C. to about 37° C.;
(B) allowing the above-treated suspension to come into contact with zone 3 of the aforementioned diagnostic preparation; and
(C) allowing at least 30 minutes to elapse for a color to develop as an indication of positive or negative citrate utilization by the unknown culture.

6. A process according to claim 5 wherein the unknown culture is brought into contact with zone 1 of the diagnostic preparation for about 4 hours at a temperature of about 37° C.

References Cited

UNITED STATES PATENTS 3,341,427   9/1967   Evans et al. _____ 195—103.5

OTHER REFERENCES

Hargrove et al., "Am. J. Clin. Path." 21: 286, 1951.

LIONEL M. SHAPIRO, Primary Examiner

M. D. HENSLEY, Assistant Examiner

U.S. Cl. X.R.

195—100